United States Patent Office 3,812,072
Patented May 21, 1974

---

3,812,072
PROCESS FOR THE PREPARATION OF PAPER COATING COMPOSITIONS
Alfred Kühlkamp and Karl Josef Rauterkus, Kelkheim, Taunus, Horst Schaefer, Schwalbach, Taunus, and Detlev Seip, Hofheim, Taunus, Germany, assignors to Farbwerke Hoechst Aktiengesellschaft vormals Meister Lucius & Bruning, Frankfurt am Main, Germany
No Drawing. Filed Feb. 14, 1972, Ser. No. 226,311
Claims priority, application Germany, Feb. 16, 1971, P 21 07 287.7
Int. Cl. C08f 37/18
U.S. Cl. 260—29.6 RW    4 Claims

ABSTRACT OF THE DISCLOSURE

In paper coating compositions, synthetic resin dispersions of the basis of vinyl acetate/ethylene copolymers which may contain a minor proportion of further comonomers, such as acrylic acid esters or amides, dienes, cross-linking agents, can be combined with water-soluble binders, such as starch, casein, and polyvinyl alcohol. This is achieved by adding to the dispersions after the polymerization, or to any one of the components of the coating composition in the course of its preparation, a non-ionic wetting agent which is a polyethylene oxide or a polypropylene oxide, or block copolymer of ethylene oxide and propylene oxide, or an oxethylated alkyl phenol or alcohol or acid, or a graft polymer of vinyl acetate and certain other monomers on polyethylene oxide. The resulting coating compositions exhibit a high pigment content at a relatively low viscosity.

---

The present invention relates to an aqueous coating composition for paper, card board and similar materials, on the basis of mineral pigments, water-soluble binding agents and aqueous vinyl ester copolymer dispersions.

In the preparation of coated printing papers, an aqueous coating composition is applied to the paper by means of a coating device. The coating composition consists normally of pigments, such as clay, of pigment dispersing agents, for example, low molecular weight polyacrylic acid or polyphosphates, and pigment binding agents. As pigment binding agents there are used either water-soluble polymers, such as casein, starch or polyvinyl alcohol, or combinations of these water-soluble binding agents with aqueous plastics dispersions. The latter combinations are especially used in the preparation of high-quality coated papers. In the production of coated papers attempts are made to obtain a maximum strength of the pigment bond with a minimum amount of binding agents. The printing properties of the coated papers, which are the prerequisite for the good reproduction of an original, depend, above all, on the pigment, and a proportion of binding agents that is too high adversely affects these properties. On the other hand, the pigment bonding must be strong enough so that the coating is not torn off by the ink splitting of high-viscosity printing inks on high-speed printing presses. It is also important that the binding agent imparts a regular surface showing a high degree of whiteness, a high smoothness as well as a high gloss, to the coating composition, and thus to the coated paper.

Synthetic resin dispersions, the polymers of which turn yellow under the action of light, are not suitable as pigment binding agents for the production of high-quality long-life coated printing papers. In addition to the above-mentioned properties, the rheological properties of the coating compositions are very important. The coating composition is required to have a good flow, so that it can be applied at a sufficiently high speed by means of the common spreading and coating processes. It should also be possible to adjust the necessary relation between the viscosity and the solid content of the coating compositions for the respective coating process. For example, coating compositions having a high viscosity are not suitable for the very common trailing-blade coating process, since for this process a maximum solid content of the coating compositions combined with a minimum viscosity is required.

Besides the water-soluble binding agents, in particular synthetic resin dispersions on the basis of styrene/butadiene and styrene/acrylic acid ester, and recently, on the basis of vinyl acetate/ethylene have become important as pigment binding agents for the production of coated papers. Although the styrene/butadiene dispersions generally result in a high strength of the pigment bond, a disadvantage of these monomer combinations resides in the long polymerization time required, and also in the strip process, which is necessary in order to eliminate by-products having a bad smell, as well as in the fact that these dispersions can only be used for short-life coated printing papers, as they have a tendency to turning yellow. In the preparation of the styrene/acrylic acid ester dispersions, the time-consuming strip process is also required in most cases. There are no such difficulties in the case of vinyl acetate/ethylene dispersions, and hence these substances are particularly suitable for the production of high-quality coated papers, owing to their high-fastness. However, there is the drawback that, when vinyl acetate/ethylene latices are used, they cannot be combined in the desired universal way with the water-soluble binding agents used in paper industries. Thus, for example, it has not been possible so far to prepare coating compositions having good flow properties, as well as a high solid content and a low viscosity, by using the common vinyl acetate/ethylene dispersions having a high pigment binding strength, together with the starch decomposed by way of oxidation, which is generally used in paper industries.

It is therefore the object of the present invention to provide a vinyl ester/ethylene dispersion having a high pigment binding strength, which can be used as pigment binding agent for the preparation of paper coating compositions, and which can be combined in any desired ratio with the water-soluble binding agents used in paper industries, such as casein, starch, and polyvinyl alcohol.

The present invention provides a process for the preparation of aqueous coating compositions on the basis of mineral pigments, pigment dispersing substances, and pigment binder combinations consisting of aqueous vinyl acetate/ethylene polymer dispersions possibly prepared in the presence of further olefinically unsaturated monomers, alone or in combination with a water-soluble binding agent, which comprises adding to the ready vinyl acetate/ethylene polymer dispersions or to the pigment suspensions consisting of the pigment, the dispersion medium and water, or to the coating compositions consisting of the pigment, the pigment binding agent, the pigment dispersion medium and water, polyalkylene oxides or block copolymers of polyethylene oxide and polypropylene oxide, or oxethylated alkyl phenols, or oxethylated aliphatic carboxylic acids having from 1 to 18 carbon atoms, or oxethylated aliphatic alcohols having from 1 to 18 carbon atoms, or graft polymers of vinyl esters, or mixtures of vinyl esters and unsaturated carboxylic acids on polyalkylene oxides, or mixtures of these substances, in a concentration of from 2 to 20% by weight, calculated on the solid content of the dispersion.

The present invention further provides the aqueous coating compositions prepared according to the process described above. The coating compositions obtained have particularly advantageous properties. Above all, the vinyl acetate/ethylene latices containing the said additives can be combined with the water-soluble binding agents casein, starch or polyvinyl alcohol in any desired ratio. As polyalkylene oxides there are suitable polyethylene oxides and block copolymers of polyethylene oxide and polypropylene oxide. Polyethylene and polypropylene oxides having a molecular weight in the range of from about 600 to 40,000 are especially suitable additives. Suitable block copolymers, of polypropylene oxide are products, the polypropylene oxide proportion of which has a molecular weight of from 1500 to 2000, and the polyethylene oxide content of which is in the range of from 10 to 90% by weight. Oxethylated alkyl phenols, oxethylated aliphatic carboxylic acids having from 1 to 18 carbon atoms, and oxethylated aliphatic alcohols having from 1 to 18 carbon atoms have proven to be effective additives in particular, when they contain at least 4 moles of ethylene oxide per mole of substance to be oxethylated. As an example for the above-mentioned acids and alcohols, there may be mentioned lauric acid, lauryl alcohol, stearic acid and stearyl alcohol. Particularly effective additives, however, are graft polymers of vinyl esters or mixtures of vinyl esters and unsaturated carboxylic esters on polyalkylene oxides, such as polyethylene oxides or polypropylene oxides. The molecular weight of the polyethylene or polypropylene oxides used for the preparation of the graft polymers may be in the range of from 600 to 40,000, the content of vinyl esters or mixtures of vinyl ester and unsaturated carboxylic acids of the graft polymers may be up to 50% by weight. As vinyl esters there may be used vinyl esters of straight-chain and branched aliphatic carboxylic acids having from 1 to 18 carbon atoms, preferably vinyl acetate, and as unsaturated carboxylic acids there may be used acrylic acid, methacrylic acid, itaconic acid, preferably crotonic acid. If mixtures of vinyl esters and unsaturated carboxylic acids are used, the vinyl ester content is above 50% by weight. The other components of the aqueous coating compositions of the invention are known and generally used for the specified purpose. The aqueous dispersions preferably show a solid content in the range of from about 40 to 60%, and the ethylene content of the polymers is from about 5 to 40% by weight. If other monomers are used besides vinyl acetate and ethylene, the polymer has advantageously a vinyl acetate content of more than 45% by weight. In this case, there may be used vinyl esters of straight-chain or branched carboxylic acids having from 2 to 18 carbon atoms, acrylic acid esters, methacrylic acid esters, maleic acid esters, or fumaric acid esters of aliphatic alcohols having from 1 to 18 carbon atoms, and vinyl chloride, furthermore, isobutylene or higher α-olefins having from 4 to 12 carbon atoms. Suitable monomer combinations are, for example, vinyl acetate/vinyl pivalate/ethylene, vinyl acetate/2-ethyl-hexanoic acid-vinyl ester/ethylene, vinyl acetate/methyl methacrylate/ethylene, and vinyl acetate/vinyl chloride/ethylene. Besides the monomers specified above, use may also be made of other monomers having a stabilizing effect, such as, for example, sodium vinyl sulphonate, olefinically unsaturated monomers containing carboxylic groups, such as acrylic, methacrylic, crotonic, or itaconic acid, or monoesters of maleic acid, the alcohol components of which may contain from 1 to 18 carbon atoms, in a concentration of up to 5% by weight, calculated on the total polymer. In addition, there may be used as components having a cross-linking effect, monomers having two or several unsaturated double bonds, such as diallyl maleate, diallyl phthalate, triallyl cyanurate, tetraallyl oxyethane, or adipic acid divinyl ester, in a low concentration.

The aqueous vinyl acetate/ethylene dispersions are prepared according to known methods at a pressure of less than 100 atmospheres. As emulsifying agents for the preparation of the vinyl ester/ethylene dispersions used, there are suitable the common anionic or non-ionic emulsifying agents, or mixtures thereof (in a concentration of from about 1 to 10% by weight, calculated on the monomers). Typical anionic emulsifying agents are, for example, sodium lauryl sulfate, alkane sulfonates having from about 10 to 14 carbon atoms, alkyl benzene sulfonates, sodium salts of sulfo-succinic acid dialkyl esters, sodium or ammonium salts of sulfuric acid semiesters of oxethylated alkyl phenols or of oxethylated long-chain aliphatic alcohols, and others. Suitable non-ionic emulsifying agents are, for example, ethylene oxide derivatives of long-chain alcohols or carboxylic acids, or of alkyl phenols, and others. The additives used for the preparation of the coating compositions of the invention may possibly be used also as emulsifying agents for the preparation of the vinyl acetate/ethylene dispersions. In these cases, however, the subsequent addition of the additives specified cannot be dispensed with, when the advantageous coating compositions are to be obtained. In the course of the preparation of the dispersions, the common radical-forming catalysts are used, such as peroxides, persulfates, or azo compounds; if a low reaction temperature is applied, it is advantageous to use redox catalyst systems.

In the course of the preparation of the aqueous emulsions, care has to be taken that the latex particles show a particle size of less than about $0.3\mu$, and that the polymers have a high molecular weight (K-values of more than 50; 1% solutions measured in acetone at 20° C.). As has already been known to experts, the adjustment of a determined particle size is possible by choosing the suitable emulsifier system; a high molecular weight can be obtained, for example, by applying low reaction temperatures.

Besides the vinyl ester/ethylene dispersions, the paper coating compositions of the invention may contain, as further pigment binding agents, water-soluble products, such as starch or starch derivatives, for example, starch degraded by way of oxidation, moreover, casein, or polyvinyl alcohol.

Among the pigments that can be used for the coating compositions, are China clay, calcium carbonate, barium sulfate, titanium dioxide, satin white, and others, which are well known in the art.

Moreover, the coating compositions contain, besides the pigment binding agents, the pigments and the additives of the invention, pigment dispersing agents, such as, for example, salts of polyacrylic acid, polyphosphates, and others also well known in the art.

The coating compositions of the invention have a solid content of from 25 to 65% by weight. Calculated on 100 parts by weight of pigment, about 0.1 to 1.0 part by weight of dispersing agent and from about 2 to 25 parts by weight of solid total binding agent are used. As total binding agent there may be used either a vinyl ester/ethylene dispersion alone, or combinations of from 10 to 90% by weight of vinyl ester/ethylene latex (calculated on the solid content) and from 90 to 10% by weight of a water-soluble binding agent.

Besides the mineral pigments, the pigment dispersing agents and the pigment binding agents, the paper coating compositions of the invention contain the additives of the invention. These additives impart to the coating compositions particularly advantageous properties. Above all, they permit the vinyl ester/ethylene latices to be combined universally with the water-soluble binding agents starch, casein, and polyvinyl alcohol. As additives, there are suitable polyalkylene oxides, ethylene oxide-containing products and, in particular, graft polymers of vinyl esters, or mixtures of vinyl ester and unsaturated carboxylic acids on polyalkylene oxides.

The additives may be added either to the ready vinyl ester/ethylene dispersions or to the pigment suspensions consisting of the pigment, water and the dispersing agent, or to the aqueous starch, casein or polyvinyl alcohol solutions, or to the ready paper coating compositions consisting of pigment, pigment binding agent, pigment dispersing agent, and water. However, it has proven to be advantageous to introduce the additives into the vinyl ester/ethylene dispersions, prior to adding the latter to the pigment suspension.

Calculated on the solid content of the aqueous vinyl ester/ethylene dispersions, the additives are used in a concentration of from 2 to 20% by weight, preferably from 5 to 8% by weight. The graft polymers are particularly effective additives, as a vinyl ester/ethylene dispersion having a high pigment binding strength is obtained already with a low concentration, which may be combined universally with casein, starch or polyvinyl alcohol, and by means of which coating compositions can be obtained that have a good flow property and can be processed without fault by means of any of the known coating processes. If the dispersions are used as the only binding agent, the coating compositions of the invention are advantageously prepared in such a way that the copolymer dispersion provided with the additive is introduced into a pigment suspension consisting of pigment, dispersing agent, and water. If binding agent combinations are used, the pigment suspensions and the aqueous binding agent are advantageously mixed prior to adding the dispersion.

The paper coating compositions are readily suitable for the processing by means of the coating devices common in paper industries, for example, by means of brushes, air knives, coating installations, roller coating installations, and doctor-blade coating installations. The vinyl ester/ethylene dispersions provided with the additives show a high pigment binding strength, and the papers coated with the coating compositions of the invention are marked by a high resistance in the printing process, as well as by an excellent light fastness.

The following examples illustrate the invention.

EXAMPLE 1

(I) Preparation of the dispersions with the additive

Aqueous solutions of polyalkylene oxides or of ethylene oxide or propylene oxide-containing products, or of graft polymers of vinyl esters or mixtures of vinyl esters and unsaturated carboxylic acids on polyalkylene oxides were added at room temperature, while stirring, to a vinyl acetate/ethylene copolymer latex having the following properties:

| | |
|---|---|
| Solid content | About 55%. |
| Ethylene content in the copolymer | About 10% by weight. |
| Residual monomer content | <0.8%. |
| K value (1% solution, acetone, 25° C.) | 96. |
| Viscosity (Epprecht rheometer AII) | 40 cp. |
| Particle size of the latex particles | About 0.18μ. |

The dispersions according to the invention thus obtained had a solid content of about 50%.

In the same manner a dispersion was prepared, using a vinyl acetate/vinyl chloride/ethylene copolymer latex (67/17/16) having the following properties:

| | |
|---|---|
| Solid content | About 55%. |
| Ethylene content in the copolymer | About 16% by weight. |
| Residual monomer content | <0.7%. |
| Viscosity (Epprecht rheometer AII) | 50 cp. |
| Particle size of the latex particles | About 0.17μ. |
| K value (1% solution, acetone, 25° C.) | 65 cp. |

(II) Preparation of the graft polymers

Polyethylene glycol having a molecular weight of 3,000 was placed into a reaction vessel provided with stirrer, dropping funnel, and reflux condenser. After the reaction vessel had been heated to an internal temperature of 70 to 80° C., a mixture consisting of vinyl acetate and dibenzoyl peroxide was added, while stirring, and the heating was continued for another hour. After cooling, a wax-like and colorless product was obtained which was clearly soluble in water, and which was composed of polyethylene glycol 3000/vinyl acetate in a weight ratio of 80.5/19.5.

(III) Preparation of paper coating compositions (a) Binding agent combination of starch/plastics dispersion.—0.4 part by weight of polysalt (sodium salt of polyacrylic acid) was dissolved in water; subsequently 100 parts by weight of China clay SPS were dispersed in this mixture, while stirring, and thereafter the calculated amount of an aqueous starch solution of about 30% strength, which had been hydrolyzed at a temperature of from 80 to 90% C., was added. Then the reaction mixture was adjusted to a solid content of 55% by means of water; subsequently the calculated amount of plastics dispersion was added, and the whole was adjusted to a pH value of 9.0 with ammonia. The viscosity of the coating compositions obtained was measured by means of a Brookfield RVT viscosimeter. Coating compositions were prepared, which contained, calculated on 100 parts by weight of China clay SPS, 20 parts by weight of solid total binding agent consisting of 15 parts by weight of starch and 5 parts by weight of plastics dispersion (solid) or 10 parts by weight of starch and 10 parts by weight of plastics dispersion (solid).

(b) Binding agent combination of casein/plastics dispersion.—The calculated amount of casein (milk casein) was rendered soluble within 30 minutes at a temperature of from 55 to 60° C. by means of soda lye and ammonia. A pigment suspension prepared according to Example III(a) consisting of 0.4 part by weight of polysalt, 100 parts by weight of china clay SPS and water was slowly stirred into this casein solution, and the mixture was adjusted to a solid content of 45%. Subsequently the calculated amount of plastics dispersion was added. Coating compositions were prepared, which contained 5 and 10 parts by weight, respectively, of casein and 10 parts by weight of plastics dispersion (solid), calculated on 100 parts by weight of China clay SPS.

(c) Binding agent combination of polyvinyl alcohol/plastics dispersion.—The calculated amount of polyvinyl alcohol (sponification degree 99%, viscosity of the 4% solution 25 to 30 cp.) was slowly introduced into water, while stirring, and the solution was then heated at 90 to 95° C. A pigment suspension prepared according to Example III(a) containing 0.3 part by weight of polysalt, 100 parts by weight of china clay SPS, 0.2 part by weight of defoaming agent, and water was stirred into the solution obtained, and the mixture was adjusted to a solid content of 52%. Subsequently the calculated amount of plastics dispersion was added. Coating compositions were prepared, which contained 4 parts by weight of polyvinyl alcohol and 4 parts by weight of plastics dispersion (solid) or 2 parts by weight of polyvinyl alcohol and 2 parts by weight of plastics dispersion (solid), calculated on 100 parts by weight of China clay SPS.

Table 1 below indicates the dispersions used as pigment binding agents for the preparation of paper coating compositions. The comparative Examples I-1, I-2 and I-3 relate to dispersions, to which no additives according to the invention were added. The Examples 1 to 12 describe vinyl acetate/ethylene dispersions, into which subsequent to their preparation, aqueous solutions of the additives described in column 4 of Table 1 were introduced. By means of these dispersions, the coating compositions of the invention were obtained.

Tables 2 and 3 indicate the viscosities of the coating compositions. The viscosities were measured by means of a Brookfield RVT viscosimeter. Table 2 indicates the viscosities with the use of the pigment binding agent combination of starch/vinyl acetate ethylene dispersions. 20 parts by weight of solid total binding agent were used, calculated on 100 parts by weight of China clay SPS (R). The first two horizontal lines show the viscosities of the basic mixtures consisting of starch, pigment and water, with a solid content of the coating composition of 55% by weight. The next three lines indicate the viscosity with the use of comparative dispersions I-1 and I-3. Using the combination of 15 parts by weight of starch/5 parts by weight of dispersion in accordance with Example I-1, the viscosity of the basic reaction mixture rose from 5700 cp. (20 r.p.m.) to 64,000 cp.

or polyvinyl alcohol, or those of the comparative examples according to I-1 or I-2 were used. Thus, for example, the IGT resistance to picking of the papers measured in cm./sec. was much higher, when the coating compositions of the invention were used. For example, with the use of the binding agent combination of 10 parts by weight of starch/10 parts by weight of dispersion according to Example I-1, an IGT resistane to picking of 33 cm./sec. was obtained; this value could be increased to 58 cm./sec., by using the graft polymer of polyethylene glycol 3000/vinyl acetate (10 parts by weight of starch/10 parts by weight of dispersion according to Example 7). When the binding agent combination of casein or polyvinyl alcohol and the dispersions was used, a marked increase of the IGT resistance to picking could also be obtained, using the coating compositions of the invention, as compared against those compositions which did not contain the additive of the invention.

TABLE 1

| Example | Polymer composition | | Additive | Percent calc. on SC of the dispersion |
|---|---|---|---|---|
| I-1 | VAC/E | 90/10 | | |
| I-2 | VAC/E | 85/15 | | |
| I-3 | VAC/VC/E | 67/17/16 | | |
| 1 | VAC/E | 90/10 | PEG (mol. wt. 3000) | 5 |
| 2 | VAC/E | 90/10 | PEG (mol. wt. 3000) | 8 |
| 3 | VAC/E | 90/10 | Additive 2 | 8 |
| 4 | VAC/E | 90/10 | Additive 3 | 8 |
| 5 | VAC/VC/E | 67/17/16 | Additive 4 | 5 |
| 6 | VAC/VC/E | 67/17/16 | Additive 4 | 7 |
| 7 | VAC/VC/E | 67/17/16 | Graft polymer PEG 3000/VAC, 80.5/19.5 | 5 |
| 8 | VAC/E | 85/15 | Graft polymer PEG 3000/VAC 80.5/19.5 | 7 |
| 9 | VAC/E | 90/10 | Graft polymer PEG 3000/VAC, 85/15 | 5 |
| 10 | VAC/VC/E | 67/17/16 | Graft polymer PEG 6000/VAC, 85/15 | 5 |
| 11 | VAC/E | 90/10 | Graft polymer PEG 4000/VAC/AA, 79.5/19.5/1 | 4 |
| 12 | VAC/VP/E | 80/5/15 | Graft polymer PEG 2000/VAC, 82/18 | 5 |

NOTE.—I-1 to I-3=Comparative Examples; VAC=vinyl acetate; E=ethylene; VC=vinyl chloride; VP=vinyl pivalate; PEG=polyethyleneglycol; AA=acrylic acid; SC=solid content.
Additive 2=oxethylated nonyl phenol with 13 moles of ethyleneoxide per mole of nonyl phenol.
Additive 3=oxethylated nonyl phenol with 30 moles of ethyleneoxide permole of nonyl phenol.
Additive 4=oxethylated polypropyleneglycol having a mol. wt. of 1750 with 65% by wt. of ethyleneoxide.

When the combination of 10 parts by weight of starch/10 parts by weight of dispersion according to Example I-1 was used, the viscosity rose from 3000 to 10,000 cp. This increase of the viscosity can be reduced or prevented by using the additives, as can clearly be seen in the subsequent lines of Table 2.

The particularly advantageous behavior of the graft polymers is shown in Example 7. In this case, an addition of only 5% by weight, calculated on the solid content of the dispersion, is sufficient, in order to prevent almost completely an increase of the viscosity of the basic mixture (from 3000 to 3100 cp.), when the pigment binding agent combination of 10 parts by weight of starch/10 parts by weight of dispersion according to Example 7 is used.

Table 3 indicates the viscosities with pigment binding agent combinations casein/dispersion and polyvinyl alcohol/dispersion. Table 3 is laid out in the same way as Table 2. The viscosities of the coating compositions of the invention correspond to those of the basic mixtures consisting of casein, pigment and water, or of polyvinyl alcohol/pigment and water.

With the coating compositions, raw papers for art printing having a weight of 80 g. per square meter were coated according to the air-knife coating process (the amount of coating was about 20 g. per square meter). The papers were subsequently dried at about 95° C., then they were calendered and stored for 24 hours at 23° C. and at a relative humidity of 50%. The papers were tested by means of an IGT device for testing the printing properties (according to Tappi Standard T 499 su 64). The results obtained are shown in Table 4.

The papers coated with the coating compositions of the invention show far more advantageous properties than those, for which binding agent combinations consisting of starch, casein or polyvinyl alcohol, or those for which binding agent combinations consisting of starch, casein

TABLE 2

| Dispersion of Example | Binding agent combination | | Solid content, percent | Brookfield RVT viscosity, cp. ( )=spindle | |
|---|---|---|---|---|---|
| | Starch | Dispersion | | 20 r.p.m. | 100 r.p.m. |
| | 10 | | 55 | 3,000 (4) | 900 (4) |
| | 15 | | 55 | 5,700 (4) | 1,700 (4) |
| I-1 | 15 | 5 | 55 | 64,000 (7) | 15,000 (7) |
| I-1 | 10 | 10 | 55 | 10,000 (6) | 2,900 (6) |
| I-3 | 10 | 10 | 55 | 11,000 (6) | 3,200 (6) |
| 1 | 15 | 5 | 55 | 12,000 (6) | 4,100 (6) |
| 2 | 15 | 5 | 55 | 7,000 (6) | 2,800 (6) |
| 3 | 10 | 10 | 55 | 6,600 (4) | 1,800 (4) |
| 4 | 10 | 10 | 55 | 5,200 (4) | 1,400 (4) |
| 5 | 10 | 10 | 55 | 5,800 (4) | 1,700 (4) |
| 6 | 10 | 10 | 55 | 5,100 (4) | 1,350 (4) |
| 7 | 10 | 10 | 55 | 3,100 (4) | 1,000 (4) |
| 7 | 15 | 5 | 55 | 5,800 (4) | 1,750 (4) |
| 8 | 15 | 5 | 55 | 5,600 (4) | 1,600 (4) |
| 9 | 15 | 5 | 55 | 5,600 (4) | 1,600 (4) |
| 10 | 15 | 5 | 55 | 5,650 (4) | 1,650 (4) |
| 11 | 15 | 5 | 55 | 5,800 (4) | 1,800 (4) |
| 12 | 15 | 5 | 55 | 5,650 (4) | 1,700 (4) |

TABLE 3

| Dispersion of Example | Binding agent combination | | Solid content, percent | Brookfield RVT viscosity, cp. ( )=spindle | |
|---|---|---|---|---|---|
| | Starch | Dispersion | | 20 r.p.m. | 100 r.p.m. |
| | 10 | | 45 | 9,800 (5) | 3,680 (5) |
| | 5 | | 45 | 2,600 (4) | 980 (4) |
| I-1 | 5 | 10 | 45 | 1,200 (4) | 820 (4) |
| I-1 | 10 | 10 | 45 | 8,000 (5) | 3,280 (5) |
| 8 | 5 | 10 | 45 | 1,700 (4) | 1,000 (4) |
| 8 | 10 | 10 | 45 | 9,400 (5) | 3,440 (5) |
| | Polyvinyl-alcohol | | | | |
| | 2 | | 52 | 3,000 (4) | 960 (4) |
| | 4 | | 52 | 3,800 (4) | 1,560 (4) |
| I-1 | 2 | 2 | 52 | 1,800 (4) | 640 (4) |
| I-1 | 4 | 4 | 52 | 3,000 (4) | 1,280 (4) |
| 8 | 2 | 2 | 52 | 1,400 (4) | 540 (4) |
| 8 | 4 | 4 | 52 | 2,600 (4) | 1,140 (4) |

TABLE 4

| Dispersion of Example | Binding agent combination | | Solid content for air-knife | Paper test (IGT resistance to picking) cm./sec.[1] |
|---|---|---|---|---|
| | Starch | Dispersion | | |
| I-1 | 10 | 10 | 34.5 | 33 (N) |
| I-3 | 10 | 10 | 34.2 | 28 (N) |
| I-1 | 15 | 5 | 31.3 | 64 (L) |
| 2 | 15 | 5 | 34.3 | 89 (L) |
| 5 | 10 | 10 | 37.0 | 48 (N) |
| 7 | 10 | 10 | 37.3 | 58 (N) |
| 8 | 15 | 5 | 34.8 | >100 (L) |
| 11 | 15 | 5 | 34.9 | >100 (L) |
| | Casein | | | |
| I-1 | 5 | 10 | 36.2 | 33 (N) |
| I-1 | 10 | 10 | 31.7 | 53 (N) |
| 8 | 5 | 10 | 35.8 | 41 (N) |
| 8 | 10 | 10 | 31.8 | 65 (N) |
| | Polyvinyl-alcohol | | | |
| I-1 | 2 | 2 | 38.4 | 44 (L) |
| I-1 | 4 | 4 | 36.1 | 34 (N) |
| 8 | 2 | 2 | 38.6 | 54 (L) |
| 8 | 4 | 4 | 36.1 | 43 (N) |

[1] Falling pendulum, 70 kg. pressure, 2 cm. roll.

NOTE.—IGT-picking oil normal viscosity (N), low viscosity (L).

What is claimed is:

1. An aqueous coating composition comprising a mineral pigment, a pigment dispersing agent, an aqueous dispersion of a copolymer of vinyl acetate and ethylene and optionally further olefinically unsaturated monomers, and a water-soluble binding agent, and as an additive therefor a graft polymer of a vinyl ester or a mixture of a vinyl ester and an unsaturated carboxylic acid on polyethylene oxide or polypropylene oxide, the polyethyleneoxide or polypropylene oxide portion of said graft polymer having a molecular weight of from 600 to 40,000 and the portion of the grafted monomer being up to 50% by weight of said graft polymer; said composition comprising from 2 to 20% by weight, based on the solids content of the aqueous copolymer dispersion, of said additive.

2. The aqueous coating composition as defined in claim 1 wherein the vinyl ester is derived from a straight-chain or branched aliphatic carboxylic acid having from 1 to 18 carbon atoms and the unsaturated carboxylic acid is selected from acrylic acid, crotonic acid, methacrylic acid and itaconic acid.

3. The aqueous coating composition as defined in claim 2 wherein the vinyl ester is vinyl acetate and the unsaturated carboxylic acid is crotonic acid.

4. The aqueous coating composition as defined in claim 1 wherein the mixture of a vinyl ester and an unsaturated carboxylic acid comprises more than 50% by weight of the vinyl ester.

References Cited
UNITED STATES PATENTS

| 3,337,482 | 8/1967 | Watanabe et al. | 260—17.4 |
| 3,645,952 | 2/1972 | Lindemann et al. | 260—29.6 |
| 3,355,322 | 11/1967 | Worrall et al. | 260—29.6 |
| 3,578,618 | 5/1971 | Beardsly | 260—17 |

MELVIN GOLDSTEIN, Primary Examiner

W. C. DANISON, JR., Assistant Examiner

U.S. Cl. X.R.

117—155 UA; 260—29.6 RB